US011737535B2

(12) United States Patent
Higdon et al.

(10) Patent No.: US 11,737,535 B2
(45) Date of Patent: Aug. 29, 2023

(54) WATERFOWL DECOY CARRIER AND METHOD

(71) Applicant: Higdon Outdoors, LLC, Paducah, KY (US)

(72) Inventors: Benjamin Robert Higdon, Paducah, KY (US); Brook A. Richard, Paducah, KY (US)

(73) Assignee: Higdon Outdoors, LLC, Paducah, KY (US)

( * ) Notice: Subject to any disclaimer, the term of this patent is extended or adjusted under 35 U.S.C. 154(b) by 773 days.

(21) Appl. No.: 16/557,752

(22) Filed: Aug. 30, 2019

(65) Prior Publication Data

US 2021/0059372 A1  Mar. 4, 2021

(51) Int. Cl.
*A45C 13/02* (2006.01)
*A45C 3/00* (2006.01)
*A01M 31/06* (2006.01)

(52) U.S. Cl.
CPC ............. *A45C 13/02* (2013.01); *A01M 31/06* (2013.01); *A45C 3/00* (2013.01); *A45C 2013/026* (2013.01)

(58) Field of Classification Search
CPC ..... A45C 13/02; A45C 2013/026; A45C 3/00; A45C 3/04; A45C 2003/007
See application file for complete search history.

(56) References Cited

U.S. PATENT DOCUMENTS

| | | | |
|---|---|---|---|
| 2,820,547 A | 1/1958 | Nelson | |
| 6,830,170 B2 | 12/2004 | Abel | |
| D587,897 S * | 3/2009 | Radke | D3/202 |
| 7,621,305 B2 * | 11/2009 | Cho | A45C 7/0063 |
| | | | 150/112 |
| 9,314,012 B1 | 4/2016 | Galloway | |
| 9,375,061 B2 | 6/2016 | Mosee | |
| 9,426,978 B1 | 8/2016 | Galloway | |
| 10,092,137 B1 | 10/2018 | Nelson et al. | |
| 10,336,504 B2 * | 7/2019 | Prezecki, II | B65D 25/06 |

(Continued)

FOREIGN PATENT DOCUMENTS

WO   2015/159255 A1   10/2015

OTHER PUBLICATIONS

Tactical Ops Gear, Landing Gear 6 Slot Duck Floater, https://ustacgear.com/products/landing-gear-6-slot-duck-floater-2, Jun. 2019.

(Continued)

*Primary Examiner* — Javier A Pagan
(74) *Attorney, Agent, or Firm* — C. Brandon Browning; Maynard Nexsen PC

(57) ABSTRACT

A waterfowl decoy carrier and method, the method including providing a carrier having a compartment defined by a floor, a continuous sidewall and an open top, wherein the compartment includes a first panel having a first free end and a first portion attached to the sidewall and a second panel having a second free and a second portion attached to the sidewall. When a single decoy is to be stored in the compartment, the compartment is arranged to include a single slot When two decoys are intended to be stored in the compartment, the compartment is arranged to include a first slot and a second slot by selectively coupling the first free end to the second free end and inserting a first decoy into the first slot and a second decoy into the second slot.

3 Claims, 7 Drawing Sheets

(56) References Cited

U.S. PATENT DOCUMENTS

| | | | |
|---|---|---|---|
| 2002/0038745 A1* | 4/2002 | Lamming | A45C 3/001 190/125 |
| 2006/0021685 A1* | 2/2006 | Cho | B60R 7/02 190/110 |
| 2006/0102497 A1* | 5/2006 | Wulf | B65D 81/3846 220/592.2 |
| 2010/0084443 A1* | 4/2010 | Adelman | A45C 7/0059 224/153 |
| 2015/0125096 A1 | 5/2015 | Mulholland et al. | |
| 2018/0042364 A1 | 2/2018 | Schmitt | |

OTHER PUBLICATIONS

Dakota, Dakota Decoy X-Treme 24 Slot Teal Decoy Bag, https://www.rogerssportinggoods.com/dakota-decoy-x-treme-24-slot-teal-decoy-bag, Jun. 2019.

Rogers, Rogers 24-Slot Teal Decoy Bag, https://www.rogerssportinggoods.com/rogers-24-slot-teal-decoy-bag, Jun. 2019.

* cited by examiner

WATERFOWL DECOY CARRIER AND METHOD

FIELD OF THE INVENTION

The present invention is directed to a waterfowl decoy carrier and, more particularly, to a bag configured for storing and transporting variable sizes, shapes and types of waterfowl decoys, the bag including a plurality of compartments with each compartment including panels arranged for selectively dividing the compartment into two or more waterfowl decoy-receiving slots.

BACKGROUND OF THE INVENTION

Bags for carrying bird decoys are known in the art. For example, U.S. Patent Application Publication No. 20180042364 discloses a waterfowl decoy carrier and blind system configured to hold a plurality of waterfowl decoys for transport to and from a desired hunting location. The carrier is configured to distribute and balance the weight and accommodate the irregular shaped decoys radially about the hunter's midsection while supported by the hunter's shoulders. The waterfowl decoy carrier generally includes a rectangular body having a top perimeter and a plurality of upward opening linearly aligned pockets. Each pocket is configured and sized to receive one or more waterfowl decoys. Further, at least one strap which is operably attached to the top perimeter of the rectangular body.

"Rogers 24-Slot Teal Decoy Bag", https://www.rogerssportinggoods.com/rogers -24-slot-teal-decoy-bag, downloaded Jul. 29, 2019, discloses a decoy bag with individual slots sewn together in a particular unchanging arrangement. The individual slots appear to be approximately the same size.

"Trunkcratepro Collapsible Portable Multi Compartments Trunk Organizer, Black", downloaded Jul. 29, 2019, https://www.amazon.com/Trunkcratepro-Collapsible-Portable-Compartments-Organizer/dp/B01ECMRFTA (Trunckcratepro) discloses an adjustable collapsible bag with two removable ridged sub dividers. Trunckcratepro discloses two dividers, which may be used to divide the interior space into two, to three or four interior spaces. The sub-dividers appear to use hook and loop strips to connect to the sidewalls of the carrier perpendicularly.

SUMMARY OF THE INVENTION

The present invention is directed to a waterfowl decoy carrier for storing and transporting variable sizes, shapes and types of waterfowl decoys. The carrier includes flexible, fabric panels which allow the space inside the carrier (e.g., boxes, cases, carriers, or bags) to be selectively configured for accommodating the different sizes, shapes and types of decoys. For example, teal decoys are relatively small decoys, while goose decoys are relatively large decoys. The present inventions allows a hunter to store and transport the decoys in a manner that protects and maintains the appearance of the decoys, which is desired for preserving their effectiveness at attracting birds. By allowing the rearranging of the dividers and area within the carrier to coincide with the sizes, shapes and styles of decoys stored therein, the carrier allows for efficient use of the area within the carrier, while protecting the decoys from degradation, which may occur if the decoys were allowed to rub against one another in transport.

According to one aspect of the invention, the carrier includes a floor and at least one set of sidewalls forming a compartment. The compartment has at least two divider panels for subdividing the compartment. One problem with adjustable dividers is losing the dividers. Permanent dividers are less flexible. The present invention addresses this by issue by attaching each divider panel to the set of sidewalls (e.g., on one end or portion of the panel) preventing its loss. The other end of the divider panel may be free of the sidewalls (e.g., on each panel's other end) allowing the interior space to be customized. Each panel's free end may be selectively coupled to other divider panel free ends forming multiple slots (slots and areas sometimes used interchangeably) within the compartment thereby subdividing the compartment. These panel free ends may be coupled together in the center of their respective compartment. The panels may be attached uniformly about the sidewall (e.g., about the sidewall's corners or in the center of the sidewall).

Different product lines can have varieties of different sizes and shapes. For example, bird decoys come in many different size, shape and varieties. In one embodiment, by connecting two panels in a compartment, the compartment may be subdivided into two slots with each slot constituting approximately half of the compartment's volume.

In another embodiment, a number of divider panels (e.g., four) maybe arranged uniformly around the compartment which when selectively coupled together may form slots in integral increments of the compartment's full volume (e.g., 100%, 75%, 50%, or 25% in the case of four panels). In one arrangement, the free ends of the panels may not be coupled together leaving the compartment volume as one slot with the compartment's full volume. In another arrangement, the free ends of two panels may be selectively connected subdividing the compartment volume in to one slot with about 25% of the compartment's full volume and the other slot about 75% of the compartment's full volume. In another arrangement, the free ends of two panels opposite each other may be selectively joined together subdividing the compartment into two slots of approximately 50% of the compartment's full volume each. In another arrangement, the free ends of three panels may be selectively joined together subdividing the compartment into three slots of approximately 50%, 25%, and 25% of the compartment's full volume. In the last arrangement, two of the panels may have been on opposite ends of the same compartment. In another arrangement, the free ends of four panels may be selectively joined together subdividing the compartment into four slots of approximately 25% of the compartment's full volume each. There are different ways in which the free ends of the panels may be connected, for example, hook and pile, magnets, buttons, snaps buttons, zippers, tongue and groove, and combinations thereof.

In a four-panel configuration with divider panels attached to the compartment sidewall corners with all divider panel ends connected together, the panels will form an essentially X-shaped cross section. In some embodiments, the divider panel's coupling ends may be coupled to other coupling ends one at a time and decoupled from other coupling ends one at a time. The connection means may be configured to allow any divider panel to be connected to any other divider panel within the compartment (e.g., selectively coupling first to second, third, or fourth ends; second to third or four ends; and the third to fourth ends).

In some embodiments, the carrier may contain additional compartments, with a similar or different number of divider panels in each compartment. The divider panels may be arranged or coupled in similar or different ways. In some embodiments, the compartment may have an open top. While in other embodiments, the compartment or carrier may have a cover. In some embodiments, the set of sidewalls may be one continuous sidewall.

When a single decoy is to be stored in the compartment, the compartment can be arranged to include a single decoy and the decoy can be inserted into the single slot (e.g., by disconnecting all the panels, and optionally arranging the panels alongside the walls). When two decoys are to be stored in the compartment, the compartment can be arranged to include two slots (e.g., by connecting two opposing panels, and optionally arranging the unconnected panels alongside the walls) and each decoy can be inserted to a slot. Similarly, when three or four decoys are to be stored in the compartment, three or four divider panels, respectively, may be coupled together. Then the three or four decoys respectively may be inserted each into their individual slot. These details are given by way of example. In other examples, more than one decoy may be stored in the same slot.

The plurality of decoys stored in the compartment may be of various sizes and shapes. Such variability can be handled by in different ways such as by using different divider panel arrangements (e.g., by connecting three out of four divider panels) or by using flexible panel dividers. Flexible panel dividers may be longer than needed to simply connect with the other divider panels to allow one slot to take up more space or to allow oddly shaped decoys to more easily fit. Subsequent to coupling multiple divider panels together to form multiple slots, the divider panels may be decoupled to form once again a single slot. Later the divider panels may be coupled again in the same or a different arrangement (e.g., divider panels one and two may be coupled), allowing a first and second decoy to be inserted into each slot. Later a third divider panel may be coupled to create form a separate space for a third decoy. Later other changes may take place such as decoupling the first divider panel forming a different two slots or coupling a fourth divider panel to create four slots for four decoys.

Uncoupled divider panels may be cumbersome. In some embodiments where divider panel ends are not coupled to other divider panel ends, the divider panels may be selectively coupled to the compartment sidewall or other divider panel walls positioned along the sidewall to secure the divider panels positions, for example, using snaps, buttons, magnets or hook and pile. Unless otherwise clear from the context coupling and decoupling divider panels will refer to coupling and decoupling divider panel ends.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
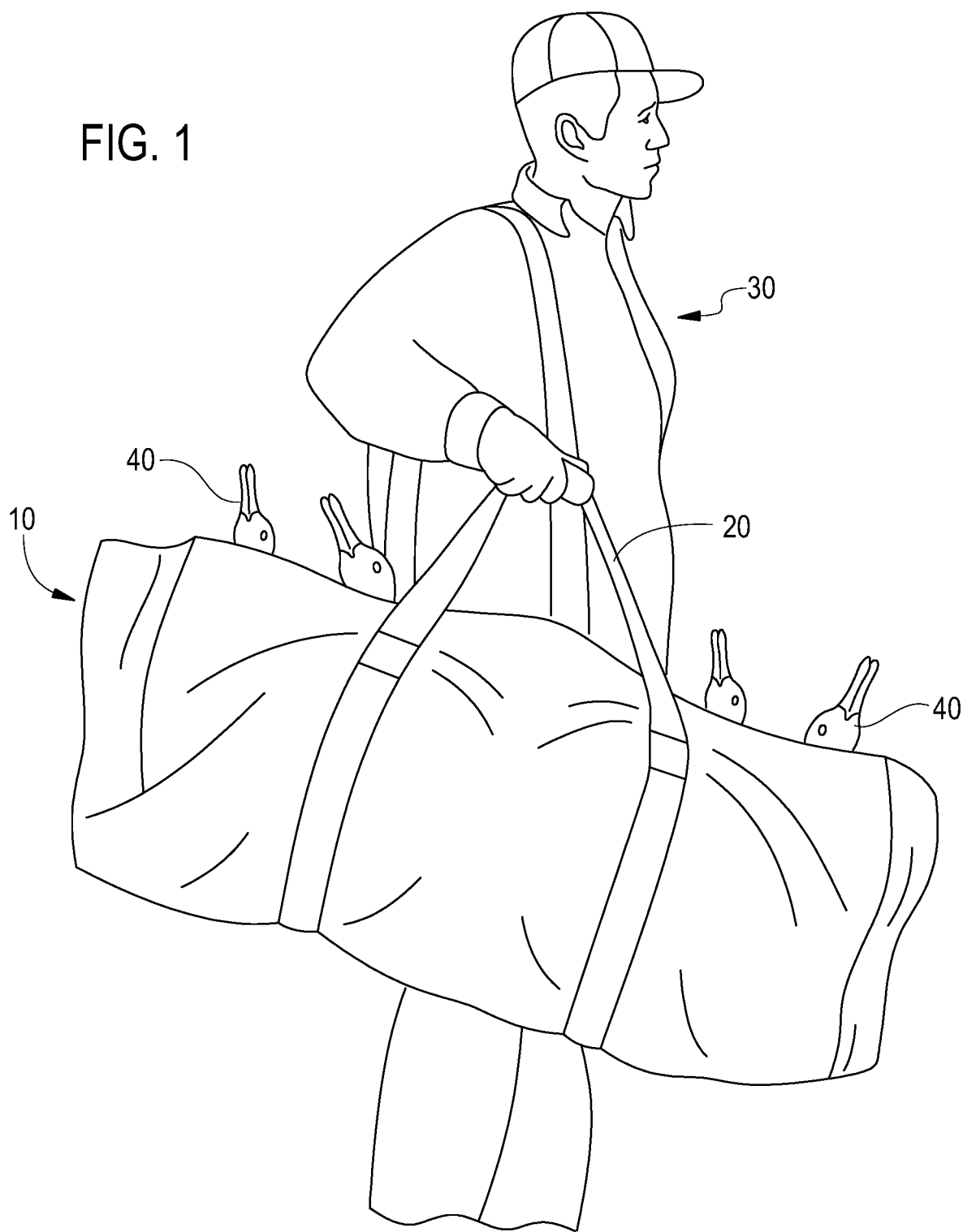
FIG. 1 is a perspective view of a waterfowl decoy carrier in accordance with the present invention being carried by a hunter.
Figure 2:
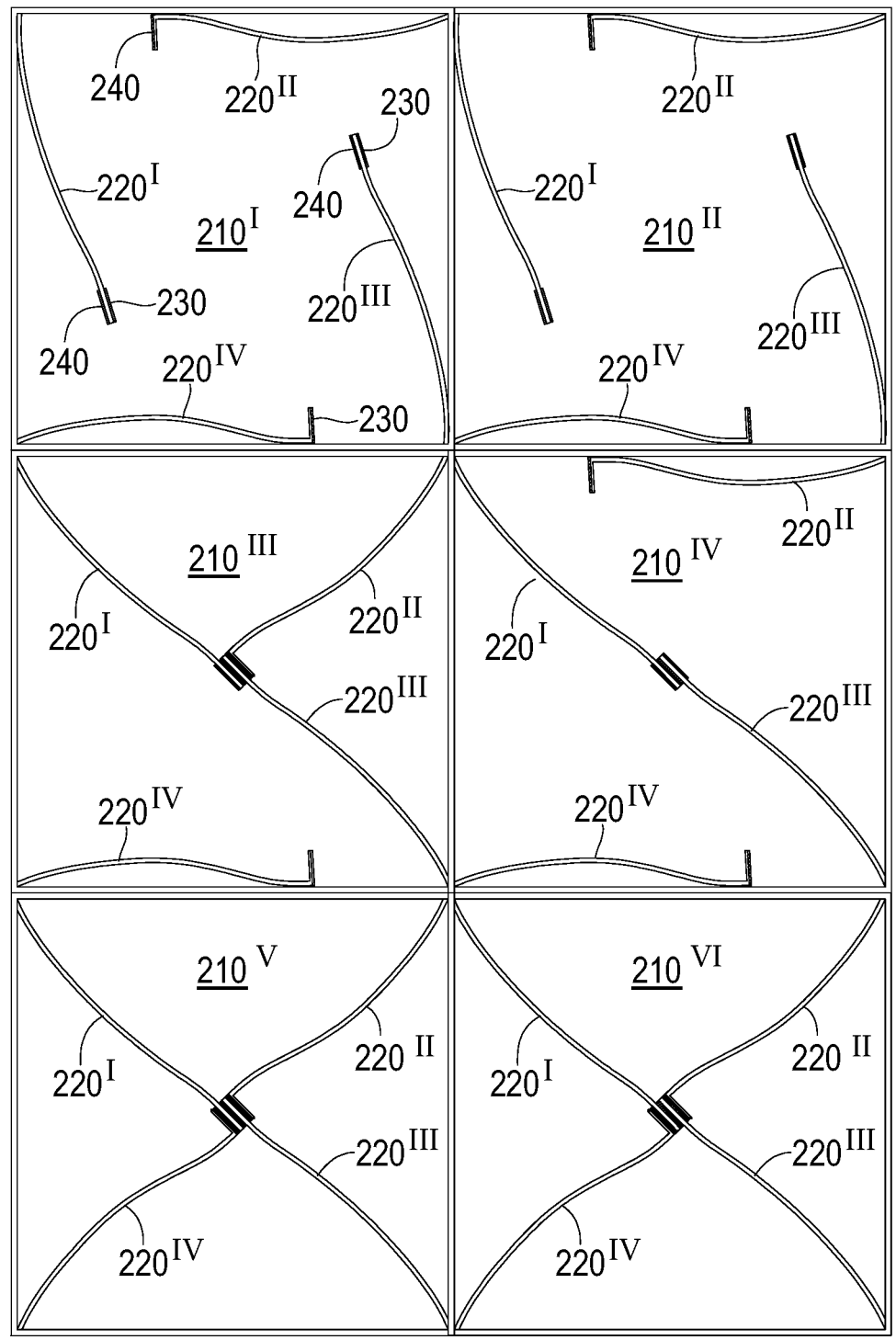
FIG. 2 is a top plan view of the carrier of FIG. 1 showing six compartments arranged in four different configurations.

FIGS. 1 through 7 depict a carrier 10 in accordance with an exemplary embodiment of the present invention. FIG. 1 shows carrier 10 being transported by a hunter. FIG. 2 shows divider panels 220 in compartments 210 of carrier 10 selectively arranged to include either one, two, three or four slots. FIGS. 3 through 6 show various potential connector mechanisms for selectively coupling divider panels 220 together. Divider panels 220 are utilized to selectively subdivide their respective compartments 210. Before the present articles, devices, and/or methods are disclosed and described in detail, it is to be understood that they are not limited to specific methods and examples unless otherwise specified, and as such may vary. It is also to be understood that the terminology as used herein is used only for the purpose of describing particular embodiments and is not intended to be limiting.

As illustrated in FIG. 1, an exemplary embodiment of the carrier 10 includes handle straps 20 or shoulder straps (not shown) to facilitate the carrying of the carrier by at least one person 30. Carrier 10 may also include shoulder straps (not shown). Carrier 10 is used to transport duck or other fowl decoys 40. In some embodiments, carrier 10 may include a top closure (not shown). In some embodiments, the floor may include a mesh bottom configured for promoting water drainage therethrough (not shown). In another embodiment, the buoyancy of carrier 10 may be increased by including sealed air pockets or other buoyant means within the floor or walls of carrier 10.

FIG. 2 is a top plan view of the interior of carrier 10 of FIG. 1. FIG. 2 shows six rectangular or square compartments 210 (collectively or generically 210, specifically $210^I$, $210^{II}$, $210^{III}$, $210^{IV}$, $210^{V}$, and $210^{VI}$), each compartment being defined by a rectangular or square sidewall 250 and including four divider panels 220 (collectively or generically 220, specifically $220^I$, $220^{II}$, $220^{III}$, and $220^{IV}$) arranged in four different arrangements. Divider panels 220 in this embodiment are attached to the corners of sidewalls 250 on one end with a coupling means 230, 240 on the other end. Coupling means 230, 240 allow free ends of panels 220 to be selectively coupled together to subdivide the compartment into different areas or slots as desired.

When uncoupled, one from another, divider panels 220 may be arranged along and selectively coupled to sidewalls 250, as shown in compartments $210^I$, $210^{II}$ to make one large space with in the compartment. Two panels 220 may also arranged to be doubled up along the same sidewall 250 section (not shown). Two divider panels 220 may be coupled together dividing the compartment into two slots each including about 50% of the space available in the compartment (e.g., as illustrated in compartment 210$^{IV}$ with panel 220$^{I}$ coupled with panel 220$^{III}$). Alternatively, one divider panel 220 may be coupled together with a neighboring divider panel 220 dividing compartment 210 into two slots, one slot with about 25% of the space available in compartment 210 and the other slot with about 75% of the space available in compartment 210 (e.g., connecting panel 220$^{I}$ and 220$^{II}$). In another arrangement, a third panel 220 may be coupled to the first two panels 220 to form two areas about 25% of the space available in compartment 210 and the other area about 50% of the space available in the compartment 210 (e.g., as illustrated in compartment 210$^{III}$). In another arrangement, a fourth panel 220 may be coupled to the other three panels 220 forming four slots of about 25% of the area of the full compartment 210.

While the preceding examples have described embodiments using four dividing panels within a compartment other examples exist including but not limited to compartments with two to eight dividing panels. While examples have shown six compartments within a carrier, other embodiments exist including but not limited to one to twelve compartments within a carrier. In some embodiments, the divider panels 220 may be padded, which may increase buoyancy of carrier 10.

Figure 3A:
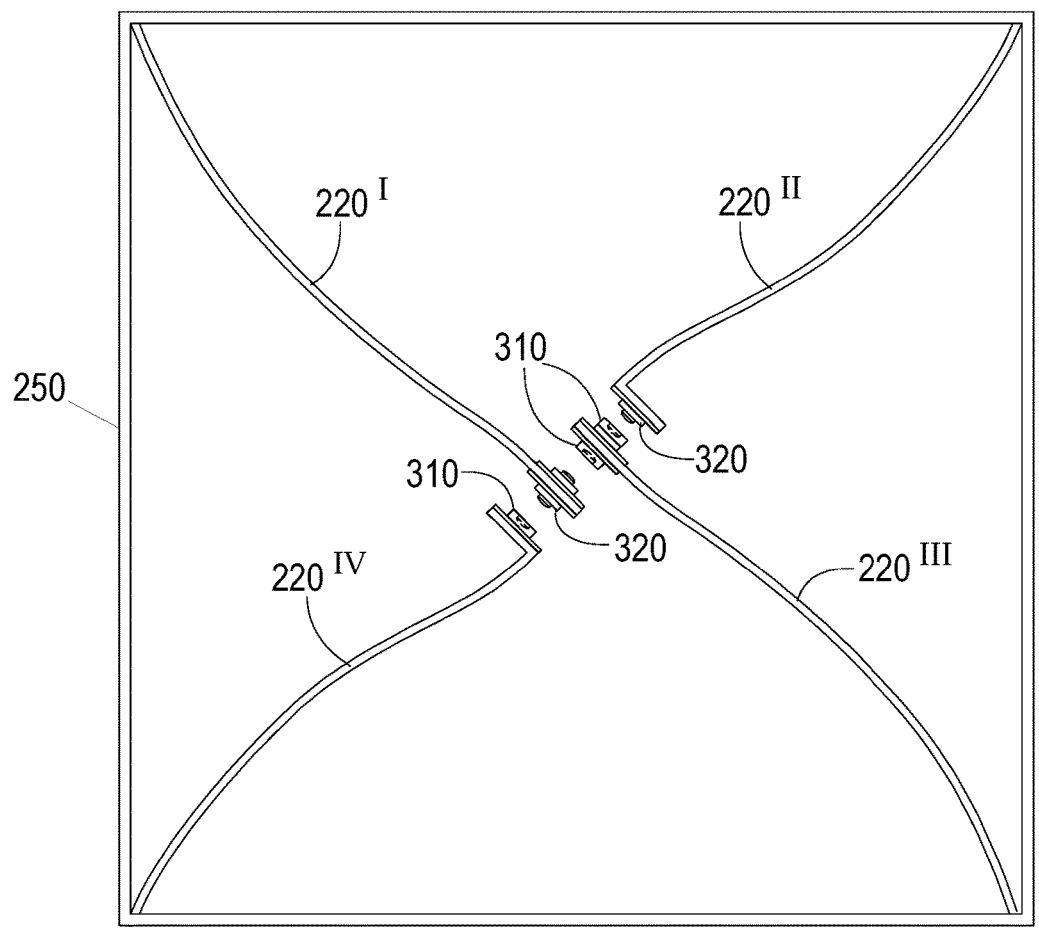
FIG. 3A is a top plan view of the carrier of FIG. 1 illustrating divider panels having a snap button connector mechanism.
Figure 3B:
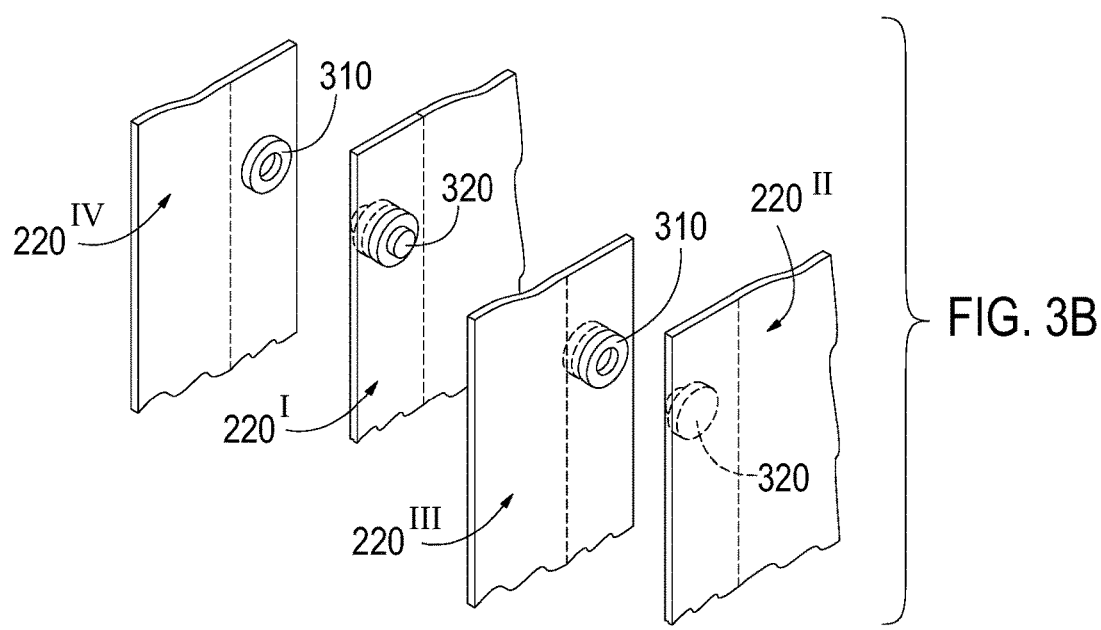
FIG. 3B is a partial perspective view of the dividers panels of FIG. 3A illustrating the snap button connector mechanism.

The coupling means for panel dividers 220 can come in variety of different mechanisms. For example, many coupling means have a complimentary surface or interface for forming the connection. For example, FIGS. 3A and 3B illustrate a schematic view a divider panel 220 of the carrier of FIG. 1 having a snap button connector. In this example, the coupling means (e.g., a snap socket 310) is arranged to connect with the coupling means compliment (e.g., a snap stud 320). In this example, two opposing panels 220$^{IV}$, 220$^{II}$ only have a coupling means on one side of their coupling end of the panel, and these coupling means complement one another. While the other two opposing panels 220$^{I}$ and 220$^{III}$ have the same coupling means or its complement on each side of their coupling end. These coupling means are arranged such that all four panels may be coupled together or that at least one each coupling arrangement may be achieved. While only one coupling point per divider panel 220 is shown, some embodiments include two or more coupling point down the end of the coupling end allowing for multiple connection points. In an alternative embodiment, each panel may have a coupling means oriented in a clockwise direction and a coupling means compliment in a counter clockwise direction to allow any divider panel 220 to connect to any other divider panel 220 regardless of which or how many divider panels 220 are sought to be connected. In some embodiments, divider panels 220 may bend or fold to facilitate a connection.

Figure 4A:
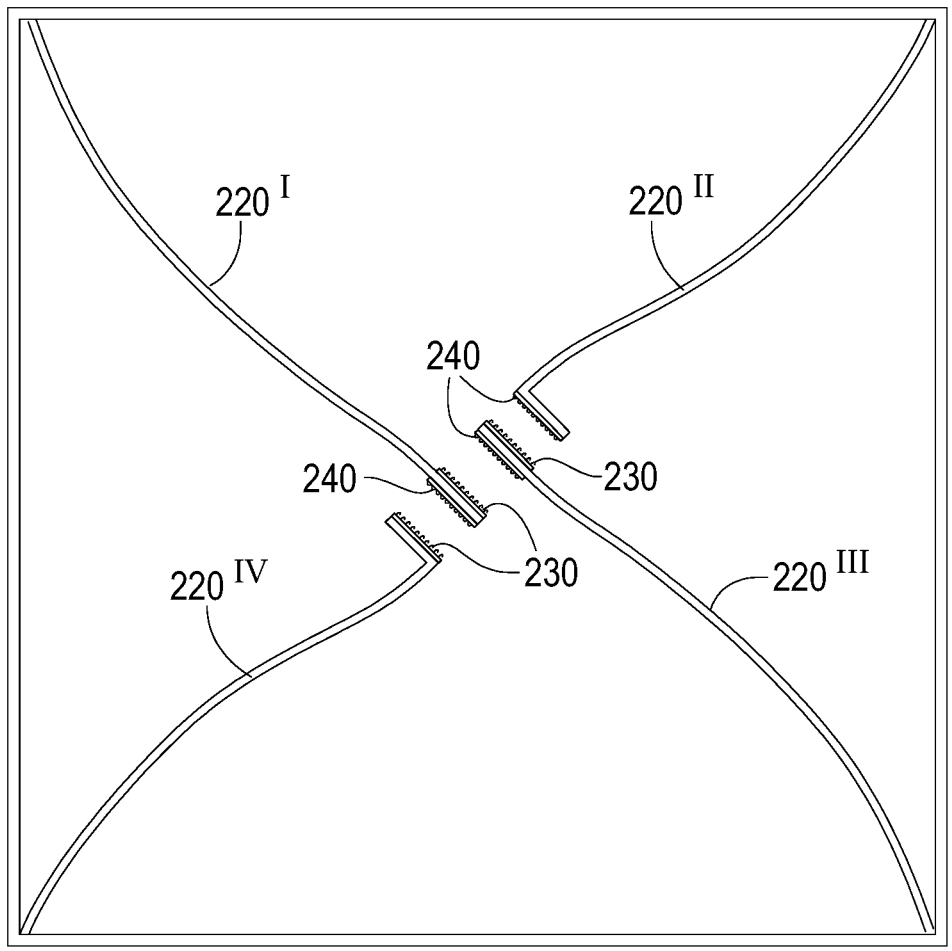
FIG. 4A is a top plan view of the carrier of FIG. 1 illustrating divider panels having a hook and loop connector mechanism.
Figure 4B:
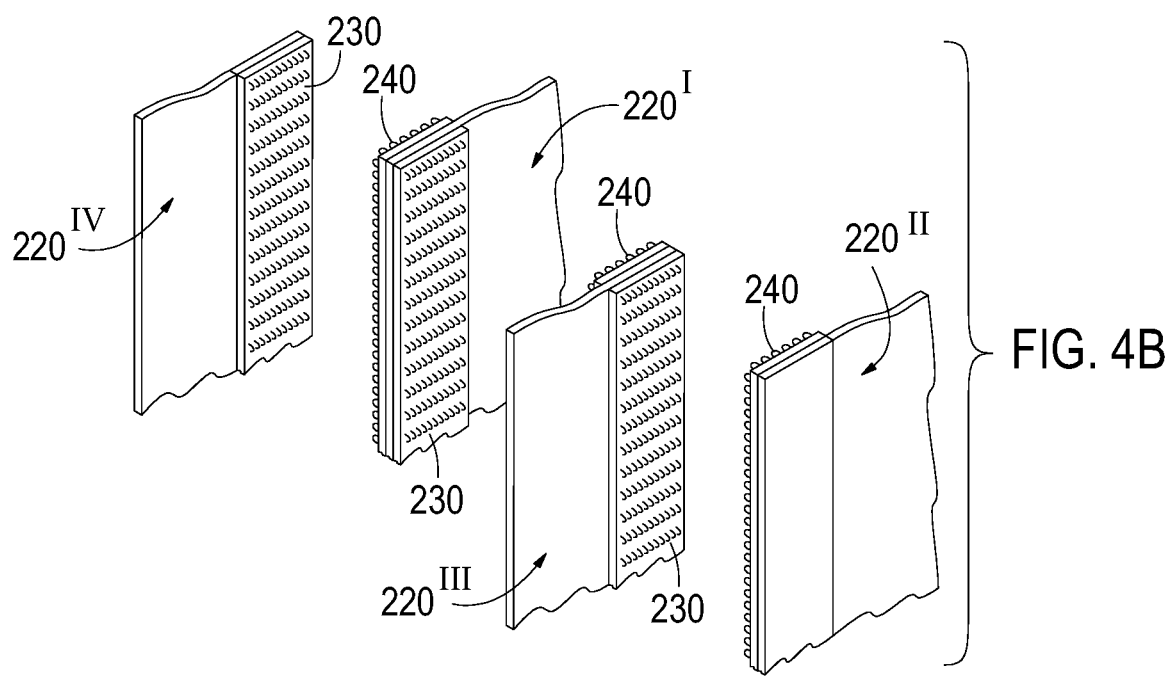
FIG. 4B is a partial perspective view of the dividers panels of FIG. 3A illustrating the hook and loop connector mechanism.

In an alternative embodiment, hook and loop strips can used instead of snap buttons. FIGS. 4A and 4B illustrate a schematic view of a divider panel 220 of the carrier 10 of FIG. 1 having a hook and loop coupling mean. The hook and loop strips may extend about the same length as the coupling end of the divider panel 220. Alternatively, some shorter length including at least one patch of coupling surface configured to align with other complimentary areas of the other panels 220 within the same compartment 210. In this example, two opposing panels 220$^{IV}$, 220$^{II}$ only have a coupling means on one side of their coupling end of the panel, and these coupling means complement one another. While the other two opposing panels 220$^{I}$ and 220$^{III}$ have the coupling means on one side and its complement on the other side of each coupling end arranged to allow coupling as illustrated. These coupling means are arranged such that any of four panels may be coupled together in any arrangement.

Figure 5A:
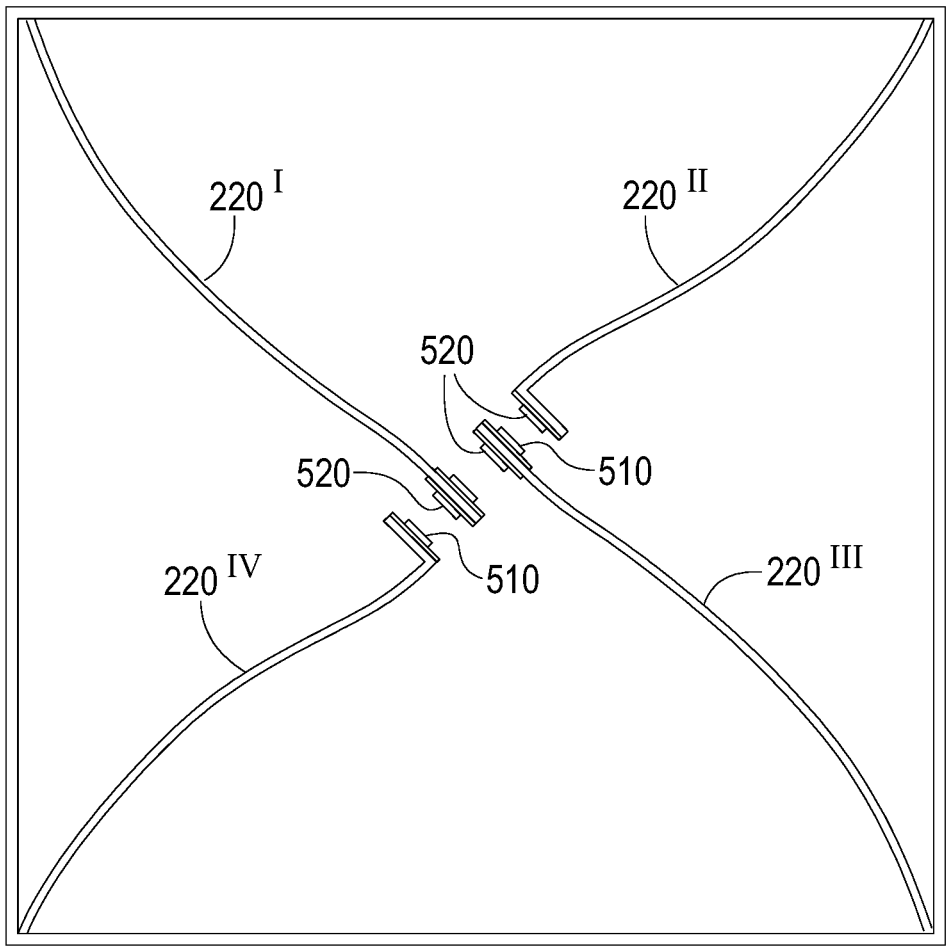
FIG. 5A is a top plan view of the carrier of FIG. 1 illustrating divider panels having a magnetic connector mechanism.
Figure 5B:
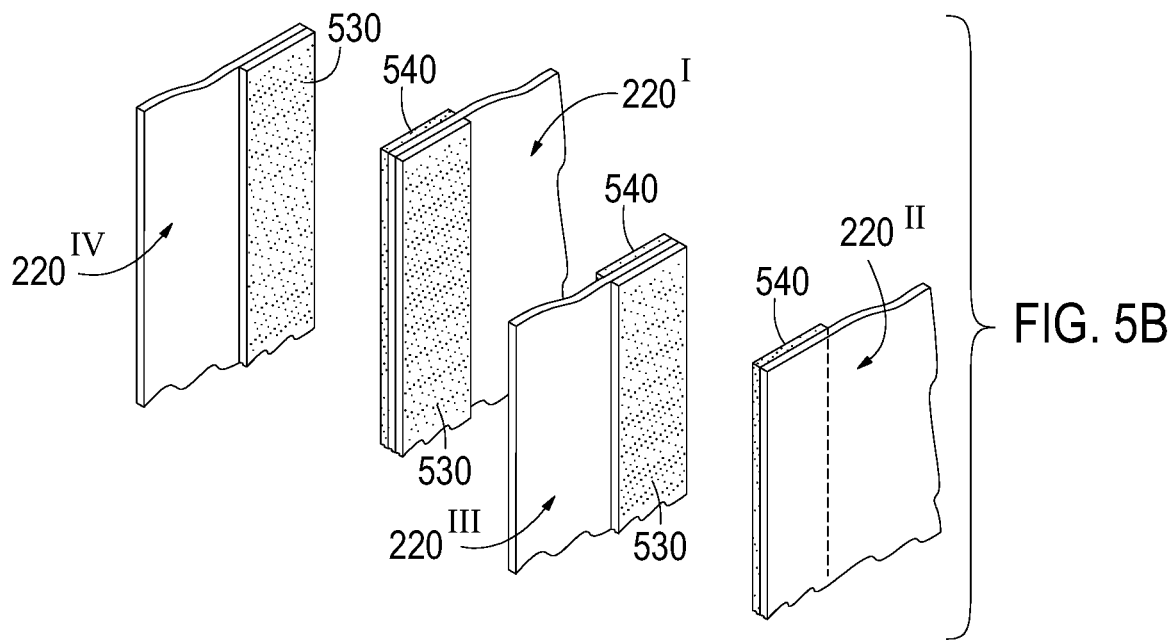
FIG. 5B is a partial perspective view of the dividers panels of FIG. 3A illustrating the magnetic connector mechanism.

In an alternative embodiment, magnetic fasteners can used instead of snap buttons or hook and loop connectors. FIGS. 5A and 5B is a schematic view of a padded divider panel of the carrier of FIG. 1 having a magnet connector. If orientation of the magnetic fasteners similar arrangements can be use as was used for the snap buttons or hook and loop fasteners. For magnetic buttons, a similar arrangement as snap buttons can be used as shown in the top half of FIG. 5A with magnet button base 510 and magnet stud 520 taking the place of snap socket 310 and snap stud 320 respectively. For magnetic strips 530, 540 and arrangement similar to the hook and loop strips can be used as described above. Some magnetic fasteners only require one magnet per divider panel 220 per connection point.

While particular arrangements of coupling means and their compliment have been discussed for snap buttons, hook and loop strips, and magnets these arrangements are interchangeable with similar results. Additionally, divider panels 220$^{IV}$ and 220$^{II}$ are shown and described as only having a single coupling means on either side of their coupling ends, other embodiments may have the coupling means or its compliment on the other side.

Figure 6A:
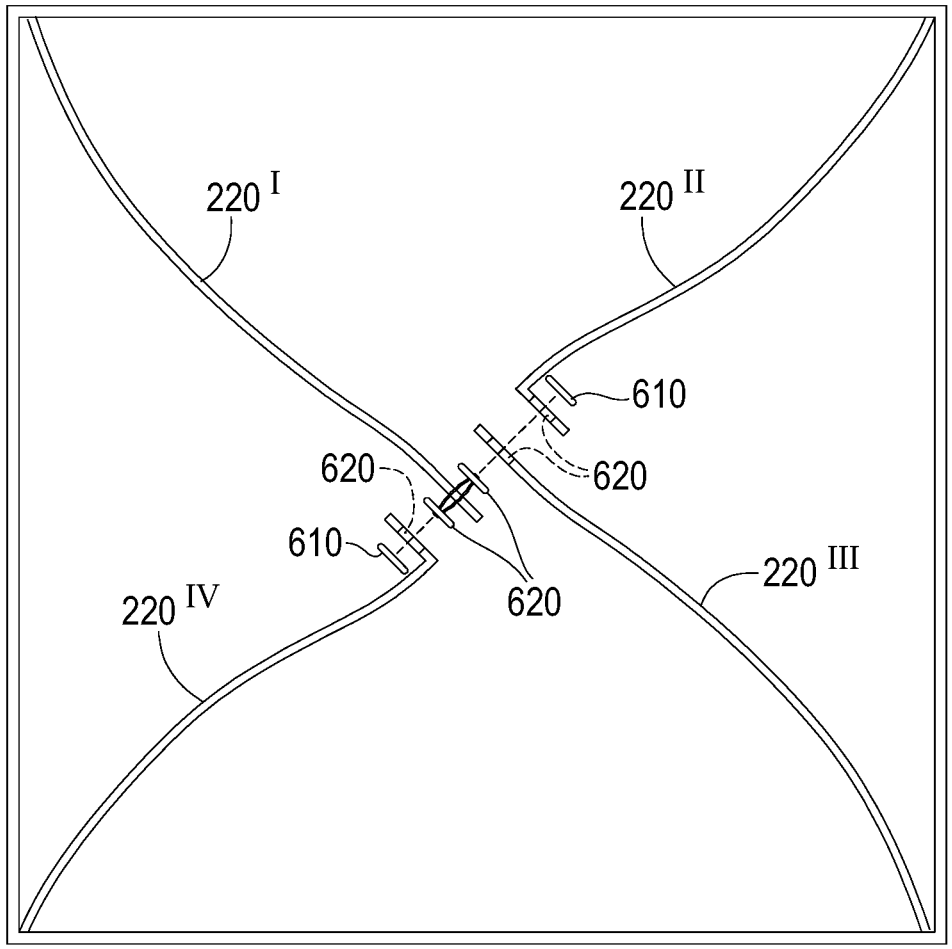
FIG. 6A is a top plan view of the carrier of FIG. 1 illustrating divider panels having button connector mechanism.
Figure 6B:
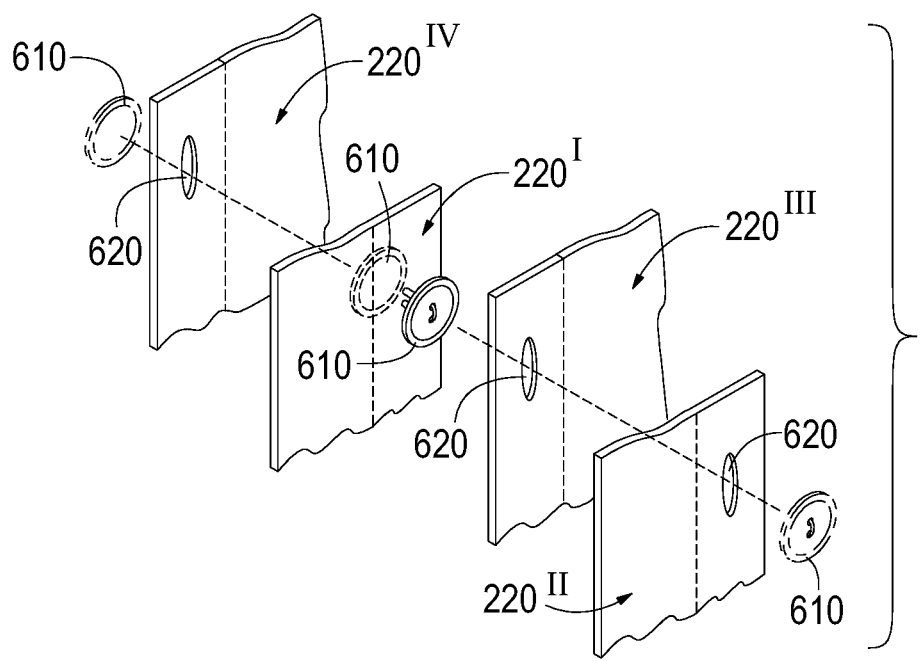
FIG. 6B is a partial perspective view of the dividers panels of FIG. 3A illustrating the magnetic connector mechanism.

In an alternative arrangement, button and eye loops can used to fasten the divider panels 220 together. As illustrated in FIGS. 6A and 6B, is a schematic view of a divider panel 220 of the carrier of FIG. 1 having at least one button 610. In this example, one panel (e.g., panel 220$^{I}$) has at least one set of buttons 610 for allowing the other panels with eyeholes 620 to be connected with the divider panel 220. In an alternative embodiment, the button 610 is only one side of the divider panel 220 and the other divider panels 220 can only connect with the divider panel 220 through the button hold on that side. In the illustration, the eyehole 620 is cut vertically in divider panel 220. In other embodiments, the eyehole may be oriented horizontally.

Figure 7:
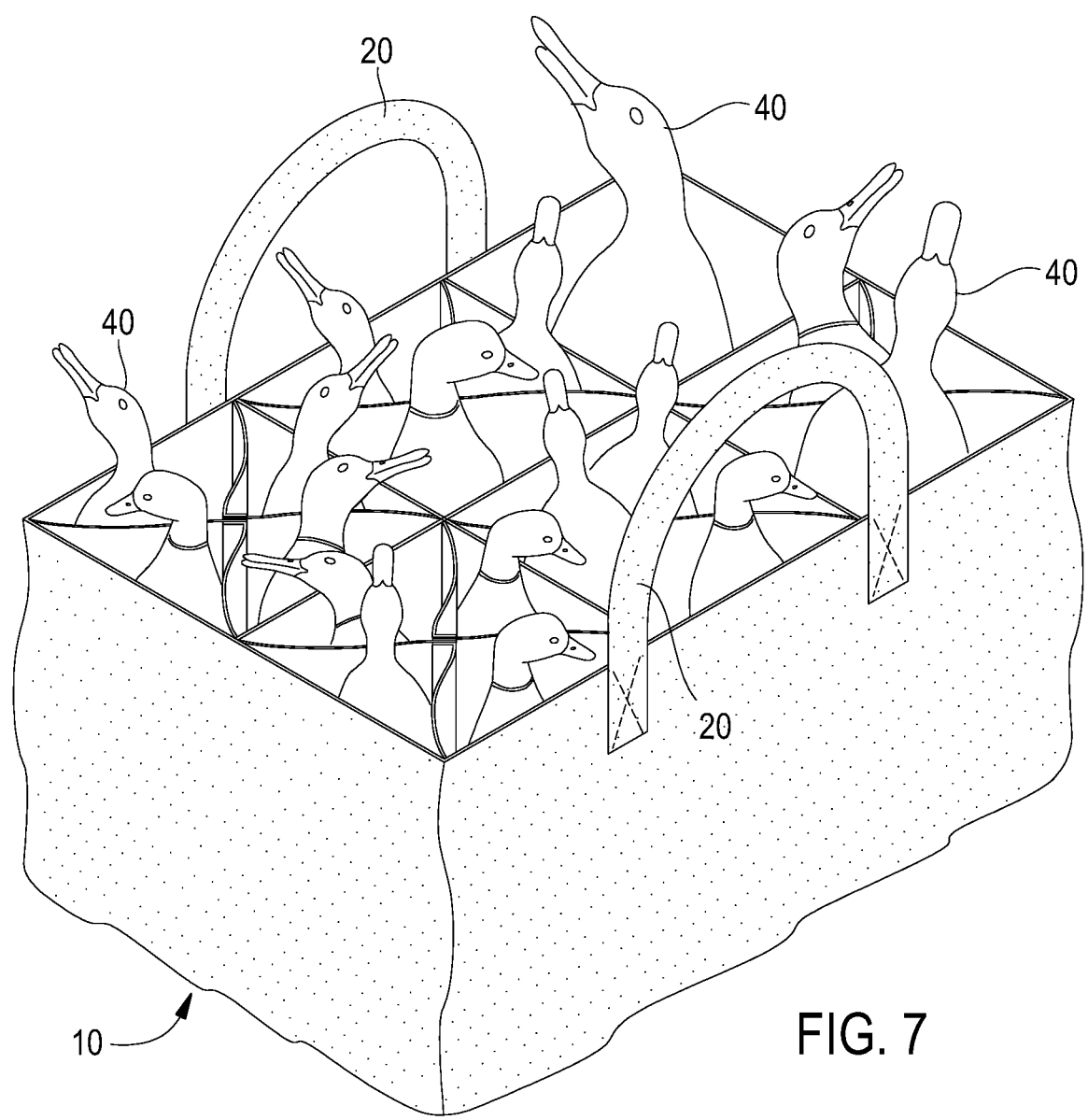
FIG. 7 is a top plan view of a plurality of waterfowl decoys stored within the carrier of FIG. 1.

FIG. 7 is a top plan view of carrier 10 showing water fowl decoys of various sizes and shapes arranged within slot of carrier 10. As illustrated in FIG. 7, some compartments 210 have been arranged to form one slot to store one item (e.g., a larger decoy). Other compartments 210 have been subdivided using the divider panels 220 to form two slots, and yet others to form three and four slots, to store two, three, and four items respectively. The divider panels 220 are selectively attached as discussed above and hence a user may reconfigure the compartments as desired. In the illustration, the decoys stick out of the tops of the slots. In other embodiments, the slots may be deeper allowing the decoys be more fully covered.

Additionally, the arrangements of the divider panels with respect to their associated compartments can be rotated or mirrored and maintain the function and spirit of the disclosure. For example, while the preceding examples have shown the divider panels 220 coupled to the sidewalls 250 at the corners of the sidewalls 250 forming an 'X' when all divider panels are connected, alternative embodiments exist where the divider panels couple to the center of the side walls forming a plus sign ('+') when all divider panels are connected. Such rotations for example could rotate the divider panel 220 and sidewall 250 connection points 45, 90, 135, 180, 225, 270, 315, or amount in between and still achieve similar function. Additional coupling means may be placed along the sidewall 250 or the along the panel walls to facilitate divider panels 220 attaching to the sidewalls 250 or other panels 220 fixing them in place while not in use.

Now, therefore, the following is claimed:

1. A carrier comprising:
    at least four compartments, each compartment of the at least four compartments including four panels and being configurable to include up to four slots, each panel of the four panels having a free end and an opposite end coupled to a compartment wall, with each free end being configured for detachably coupling to at least one other of the free ends, each free end having a first section and a second section,
    coupling means for selectively coupling two or more of the free ends, the coupling means including two first couplers on first sections of two free ends and two second complementary couplers on second sections of two complementary free ends,
    wherein the first compartment includes a single slot,
    wherein the second compartment includes a pair of slots,
    wherein the third compartment includes three slots, and
    wherein the fourth compartment includes four slots.

2. The carrier of claim 1, wherein each opposite end is coupled to a distinct compartment wall corner.

3. The carrier of claim 1, wherein the single slot has four corners and each slot of the pair of slots, three slots and four slots has three walls.

\* \* \* \* \*